United States Patent
Margolin

(10) Patent No.: US 9,465,104 B2
(45) Date of Patent: *Oct. 11, 2016

(54) ADS-B RADAR

(71) Applicant: Jed Margolin, VC Highlands, NV (US)

(72) Inventor: Jed Margolin, VC Highlands, NV (US)

(*) Notice: Subject to any disclaimer, the term of this patent is extended or adjusted under 35 U.S.C. 154(b) by 596 days.

This patent is subject to a terminal disclaimer.

(21) Appl. No.: 14/146,202

(22) Filed: Jan. 2, 2014

(65) Prior Publication Data

US 2015/0097714 A1 Apr. 9, 2015

Related U.S. Application Data

(60) Provisional application No. 61/887,338, filed on Oct. 5, 2013.

(51) Int. Cl.
*G01S 13/00* (2006.01)
*G01S 13/93* (2006.01)
*G01S 13/42* (2006.01)

(52) U.S. Cl.
CPC ............ *G01S 13/9303* (2013.01); *G01S 13/42* (2013.01)

(58) Field of Classification Search
CPC .. G01S 13/9303; G01S 11/02; G01S 13/003; G01S 5/12; G01S 13/42
USPC .............................................. 342/29, 30, 118
See application file for complete search history.

(56) References Cited

U.S. PATENT DOCUMENTS

| | | | |
|---|---|---|---|
| 5,153,836 A | 10/1992 | Fraughton et al. | |
| 7,414,567 B2 | 8/2008 | Zhang et al. | |
| 8,643,534 B2 * | 2/2014 | Margolin | G01S 5/12 |
| | | | 342/146 |
| 2010/0090882 A1 * | 4/2010 | Donovan | G01S 13/781 |
| | | | 342/32 |
| 2011/0140950 A1 | 6/2011 | Andersson | |
| 2011/0156878 A1 * | 6/2011 | Wu | G01S 5/0081 |
| | | | 340/10.1 |
| 2011/0169684 A1 * | 7/2011 | Margolin | G01S 5/12 |
| | | | 342/30 |
| 2013/0176163 A1 | 7/2013 | Margolin | |

FOREIGN PATENT DOCUMENTS

EP 2136222 A1 12/2009

OTHER PUBLICATIONS

14 CFR § 91.113(b) Right-of-way rules: Except water operations.
14 CFR § 91.115(a) Right-of-way rules: Water operations.
Gulf of Mexico Helo Ops Ready for ADS-B, Aviation Week & Space Technology, Francis Fiorino, Feb. 26, 2007, p. 56.
Sensing Requirements for Unmanned Air Vehicles, AFRL's Air Vehicles Directorate, Control Sciences Division, Systems Development Branch, Wright-Patterson AFB OH, Jun. 2004, http://www.afrlhorizons.com/Briefs/Jun04/VA0306.html.
Presentation entitled, Developing Sense & Avoid Requirements for Meeting an Equivalent Level of Safety (6MB | ppt), given by Russ Wolfe, Technology IPT Lead, Access 5 Project at UVS Tech 2006. Jan. 18, 2006.
Presentation: Integration into the National Airspace System (NAS) given by John Timmerman of the FAA's Air Traffic Organization (Jul. 12, 2005).
Zone Ready for Drone, Apr. 7, 2006, on the web site for the FAA's Air Traffic Organization Employees, http://www.ato.faa.gov/DesktopDefault.aspx?tabindex=4&tabid=17&itemid=937&mid=103.

(Continued)

*Primary Examiner* — Timothy A Brainard

(57) ABSTRACT

The reliability and safety of Automatic Dependent Surveillance-Broadcast (ADS-B) are improved by using the signals transmitted from an ADS-B unit as a radar transmitter with a receiver used to receive reflections.

3 Claims, 4 Drawing Sheets

(56) References Cited

OTHER PUBLICATIONS

Quadrennial Roles and Missions Review Report, Department of Defense, Jan. 2009, p. 29 (PDF p. 37) www.defenselink.mil/news/Jan2009/QRMFinalReport_v26Jan.pdf.

Automatic Dependent Surveillance Broadcast (ADS-B) Surveillance Development for Air Traffic Management, PDF p. 5. www.airbus.com/fileadmin/media_gallery/files/brochures_publications/FAST47_5.adsb.pdf.

Exploiting the Automatic Dependent Surveillance Broadcast System Via False Target Injection; Thesis by Domenic Magazu III, Captain, USAF; AFIT/GCO/ENG/12-07; Department of the Air Force, Air University; Air Force Institute of Technology; Mar. 2012. PDF pp. 49-54. http://www.dtic.mil/cgi-bin/GetTRDoc?Location=U2&doc=GetTRDoc.pdf&AD=ADA561697.

Security of ADS-B: State of the Art and Beyond Martin Strohmeier (University of Oxford, United Kingdom), Vincent Lenders (armasuisse, Switzerland), Ivan Martinovic (University of Oxford, United Kingdom); Jul. 13, 2013 http://arxiv-web3.library.cornell.edu/pdf/1307.3664.

* cited by examiner

ADS-B RADAR

CROSS REFERENCES TO RELATED APPLICATIONS

This application claims the benefit of U.S. Provisional Application No. 61/887,338 filed on Oct. 5, 2013. The present invention is an improvement on U.S. patent application Ser. No. 13/594,815 (Publication 2013/0176163) System for sensing aircraft and other objects by the present inventor and is hereby incorporated by reference herein. [IDS Cite 1]

BACKGROUND OF THE INVENTION

1. Field of Invention

This invention relates to the field of sensing aircraft and other objects and is part of the See and Avoid (SAA) function for manned aircraft and the Detect, Sense and Avoid (DSA) function for remotely piloted vehicles (RPVs) and unmanned aerial vehicles (UAVs). RPV is an older term for UAV. Drone is another older term for UAV. "UCAV" shall mean "Unmanned Combat Aerial Vehicle." UCAV is also sometimes defined as an "Uninhabited Combat Aerial Vehicle." UCAV is a UAV that is intended for use in combat. UAS means "Unmanned Aerial System." UCAS means "Unmanned Combat Air System." The characteristics all these vehicles have in common is that there is no human pilot onboard, and although they may be operated autonomously they can also be controlled by a remotely located operator or pilot. The term UAV shall be used as a generic term for such vehicles. Detect, Sense, and Avoid (DSA) is also commonly called Sense and Avoid (SAA) since "Detect" and "Sense" mostly mean the same thing. This invention is directed to the "See" in "See and Avoid" and the "Sense" in "Sense and Avoid." Automatic Dependent Surveillance-Broadcast (ADS-B) is the system by which an aircraft periodically transmits a message comprising its identification, location, altitude, and heading. The term "datastream" means the stream of data comprising the ADS-B message. The term "bitstream" means the same as "datastream."

2. Prior Art

In an aircraft with the pilot onboard, Sense and Avoid is called See and Avoid. FAA Regulations do not give much guidance for seeing other aircraft.

Right-of-way rules: Except water operations 14 CFR §91.113(b) [IDS Cite 2]:
(b) General. When weather conditions permit, regardless of whether an operation is conducted under instrument flight rules or visual flight rules, vigilance shall be maintained by each person operating an aircraft so as to see and avoid other aircraft. When a rule of this section gives another aircraft the right-of-way, the pilot shall give way to that aircraft and may not pass over, under, or ahead of it unless well clear.

Right-of-way rules: Water operations 14 CFR §91.115(a) [IDS Cite 3]
(a) General. Each person operating an aircraft on the water shall, insofar as possible, keep clear of all vessels and avoid impeding their navigation, and shall give way to any vessel or other aircraft that is given the right-of-way by any rule of this section.

When operating under Visual Flight Rules the idea is to look out small windows providing a limited field of view and hope you see any nearby aircraft in time to avoid a collision. This is made more difficult because of the wide range of aircraft sizes and speeds. (Is it a large aircraft far away or a small aircraft much closer?) This is even more difficult under instrument flight rules where there may be no visibility.

UAVs have special problems sensing other aircraft.
1. If the UAV is flown manually by a remote pilot looking at the video produced by a camera mounted in the nose of the aircraft the field of view will be too limited to see other aircraft other than those directly ahead.
2. If the UAV is flown autonomously there is no human pilot. If the flight is supervised by a human operator the problem remains that the field of view from a camera mounted in the nose of the aircraft will be too limited.

A system by which an aircraft periodically transmits its identification, location, altitude, and heading is taught by U.S. Pat. No. 5,153,836 Universal dynamic navigation, surveillance, emergency location, and collision avoidance system and method issued Oct. 10, 1992 to Fraughton et al. [IDS Cite 4] and was materially adopted by the FAA as Automatic Dependent Surveillance-Broadcast (ADS-B). According to the article Gulf of Mexico Helo Ops Ready for ADS-B in Aviation Week & Space Technology (Feb. 26, 2007, page 56) [IDS Cite 5]:

By the end of 2010, FAA expects to have the ADS-B system tested and operationally acceptable for the NAS, with Houston Center providing services in the Gulf region. By 2013, all of the U.S. is scheduled to be covered with ground infrastructure.

The ADS-B system is used as a radar in U.S. Pat. No. 7,414,567 ADS-B radar system issued Aug. 19, 2008 to Zhang et al. [IDS Cite 6] Zhang modifies the standard ADS-B equipment by providing for random phase modulation that is added to a standard ADS-B waveform utilizing it as a primary radar signal. Phase coherent radio-frequency electronics are used for modulations and de-modulations and the phase modulator can be inserted bit by bit at a 180 degree phase shift per bit change. (See Column 3, lines 49-64)

One of Zhan's reasons for introducing random phase modulation is to raise the transmit spectrum sidelobes. (See Column 8, lines 23-27).

The reason why raising the transmit spectrum sidelobes is desirable appears to be because (1) raising the peaks in the transmit spectrum will increase the peaks in the spectrum of a reflected target signal and (2) the peaks in the spectrum of the reflected signal are used to compute the angles-of-arrival of the reflected target signal, i.e. the target. (See Column 7, lines 10-26)

Note that determining the angles-of-arrival of a signal cannot be done with a single omnidirectional antenna. It requires more than one antenna. Indeed, Zahn uses two antenna arrays, i.e two arrays of antennas. See Column 6, lines 39-45:

Referring again to FIG. 1, antenna system 50 includes a plurality of antennas, which, in the embodiment shown, include a top circular array antenna 51, and a bottom circular array antenna 52. The arrays include individual elements 53 (FIG. 4). Circular array antennas 51 and 52 may be of a 4- or 8-element type as is common for TCAS systems or a 16-element type antenna.

Another reason for introducing random phase modulation is for identifying the reflected signal. See Column 6, lines 26-36:

The phase shift is inserted pulse-by-pulse, and the pulse-position modulation with phase shifting is synthesized digitally at the I/Q baseband and up-converted to 1090 MHz carrier frequency. In the embodiment shown, a 180.degree. phase shift is added pulse-by-pulse in a random manner. In addition, the random phase shift code is put in memory during each message transmission. When reflected pulses are received, the system will try to match the amplitude and phase changes from pulse to pulse in a pulse-compression or matched filtering process, as discussed below in further detail. There is a weakness in Zahn's system when the target is an Adversary. The Adversary can receive Zahn's signal, see that the phase of the bits is being changed, and know that Zahn is using his ADS-B Radar. The Adversary will have to assume he has been detected and has lost the element of surprise. As a result, Zahn has also lost an element of surprise because there is value in detecting an Adversary who does not know he has been detected. The invention of the current inventor teaches such a system.

In European Patent Application EP2136222 Validity check of vehicle position information published Dec. 23, 2009 (Persson, et al.) [IDS Cite 7] ADS-B is not used as a radar. Instead, Persson assumes that the target is broadcasting ADS-B signals. The direction to the target is determined using a directional antenna. The range to the target is determined when the target is sending a proper time-synchronized ADS-B signal. If the target is not broadcasting a valid ADS-B signal then radar must be used. See page 3, paragraphs 19, 20, and 21.

U.S. Patent Application Publication Number 20110140950 Validity check of vehicle position information transmitted over a time-synchronized data link published Jun. 16, 2011 [IDS Cite 8] contains the same disclosure as the above European Patent Application EP2136222. The title makes it clear that the invention requires a time-synchronized data link. Note that the U.S. Patent Application Publication lists only Svante Anderson as the inventor. Svante Anderson is listed as a co-inventor on the European Patent Application.

Where ADS-B is relied upon to prevent mid-air collisions, an aircraft that does not have the equipment installed (or ADS-B is broken or has been deliberately turned off) is a hazard to itself and other aircraft in the vicinity.

Current Practice in Flying UAVs

The current practice in flying UAVs in civilian airspace is typified by the report Sensing Requirements for Unmanned Air Vehicles by AFRL's Air Vehicles Directorate, Control Sciences Division, Systems Development Branch, Wright-Patterson AFB OH, June 2004, which relies on computer-intelligence to use sensors to sense and avoid other aircraft. [IDS Cite 9]

According to the presentation entitled Developing Sense & Avoid Requirements for Meeting an Equivalent Level of Safety given by Russ Wolfe, Technology IPT Lead, Access 5 Project at UVS Tech 2006 this had not changed as of Jan. 18, 2006. [IDS Cite 10] Access 5 was a national project sponsored by NASA and Industry with participation by the FAA and DOD to introduce high altitude long endurance (HALE) remotely operated aircraft (ROA) to routine flights in the National Airspace System (NAS). Access 5 started in May 2004 but when NASA withdrew its support (and funding) the Industry members decided not to spend their own money and Access 5 was dissolved at the end of 2005.

The presentation Integration into the National Airspace System (NAS) given by John Timmerman of the FAA's Air Traffic Organization (Jul. 12, 2005) essentially says that under current UAS Operations in the NAS UAVs should not harm other aircraft or the public. (Page 3: "While ensuring 'no harm' to other NAS customers and public") [IDS Cite 11]

The article Zone Ready for Drone, Apr. 7, 2006, on the web site for the FAA's Air Traffic Organization Employees states that [IDS Cite 12], Since March 29, a temporary flight restriction . . . has limited access to the airspace along almost 350 miles of the border, expanding an earlier TFR near Nogales. The restriction is in effect nightly from 6 p.m. to 9 a.m., although that time can be expanded by issuance of a Notice to Airmen. Aircraft wishing to fly in the TFR when it is active must receive authorization from air traffic control prior to entry. Once in, pilots are required to maintain two-way communication with ATC and transmit a discrete transponder code.

The reason for the TFR is to enable Predator UAVs to patrol the border. The article quotes Stephen Glowacki, a Systems Safety and Procedures specialist with the FAA's Air Traffic Organization as saying:

This is an extreme situation that has been presented to us," states Stephen Glowacki, a Systems Safety and Procedures specialist with the FAA's Air Traffic Organization, stressing the nation's security. "We have been working with U.S. Customs and Border Protection to try and answer this situation."

Inserting UASs into the National Airspace System is not a simple feat. According to Glowacki, the technology and certification that will permit unmanned aircraft to "see and avoid" other air traffic is still eight to ten years away. In the mean time, a carefully controlled environment is needed.

From Quadrennial Roles and Missions Review Report, Department of Defense, January 2009, page 29 [IDS Cite 13]:

U.S. Joint Forces Command Joint UAS Center of Excellence has identified three areas necessary to ensure access to applicable classes of the National Airspace System: (1) Airworthiness Certification; (2) establishment of standardized basic UAS qualifications consistent with Federal Aviation Administration guidelines for each class of airspace; and (3) development of sense and avoid technology. Working with the Services, the U.S. Joint Forces Command Joint UAS Center of Excellence will ensure these areas are addressed during UAS development.

(Emphasis added.)

OBJECTIVES

Therefore, an objective of the present invention is to improve the ADS-B system by using ADS-B as a radar system for sensing aircraft and other objects so that aircraft equipped with ADS-B can detect target aircraft not equipped with ADS-B, or the target aircraft's ADS-B is broken or has been deliberately turned off, or a false ADS-B signal is being emitted.

SUMMARY OF THE INVENTION

Automatic Dependent Surveillance-Broadcast (ADS-B) can be improved by using the signal transmitted from an ADS-B unit as a radar transmitter with the ADS-B receiver used to receive reflections. In a first preferred embodiment a standard omni-directional antenna is used to receive the reflections of the ADS-B signal. The time delays between the transmitted signal and the reflections are used to determine the range of other aircraft and match the range and number of targets to the ADS-B signals normally received. Doppler analysis can be used to confirm the speeds of the targets. The integrity of a reflected signal is determined by comparing the datastream of the reflected signal with the datastream of the transmitted signal. If more than one such reflected signal is received by the ADS-B receiver then the closest reflected signal is a true target and the other reflected signals are either from additional aircraft farther away or are being caused by an unfriendly target transmitting a delayed version of the reflected signal. In order for an adversary target aircraft to produce a false signal corresponding to a range that is closer than its true position it would have to exactly predict the datastreams being transmitted. The ADS-B messages transmitted in the datastream contain items such as Aircraft identification
Absolute bearing/2D distance
Heading/Tracking
Wake vortex category
Relative altitude/Absolute altitude
Ground speed
Vertical velocity See Automatic Dependent Surveillance Broadcast (ADS-B) Surveillance Development for Air Traffic Management [IDS Cite 14, PDF page 5].

A more detailed description can be found in Exploiting the Automatic Dependent Surveillance Broadcast System Via False Target Injection; Thesis by Domenic Magazu III, Captain, USAF [IDS Cite 15, PDF pages 49-54].

It is unlikely that all of these parameters can be predicted exactly. However, if an aircraft using ADS-B as a radar has reason to believe it is receiving false reflected signals it can randomly vary its transmission times.

By using the ADS-B datastream to determine the integrity of reflected signals, there is no difference in the transmitted signal between the ADS-B radar system and an ADS-B system that does not use the transmitted signal for radar. An adversary target will have no way of knowing if he has been detected. The user of the ADS-B radar can use the tactic of acting as though he has not detected the adversary target. At some point the tactic can change, such as by shooting down the adversary target.

In a second preferred embodiment a directional receive antenna is used to give both the range and bearing to aircraft and other objects in the vicinity of the user's aircraft even when other aircraft are not equipped with ADS-B.

The use of a directional antenna requires the ability to aim the antenna. This can be done by physically aiming the antennas (such as when the antenna uses a parabolic dish reflector) or by using an active electronically scanned array. Because each area must be separately scanned the time to detect and locate targets is increased according to the directionality of the antenna. The use of a directional antenna reduces the radio frequency noise received that is produced by the Sun, except when the antenna is pointed at the Sun. (The level of the sun's contribution depends on the solar flux.) It also reduces the noise received that is produced by the Earth (about 290K.), except when the antenna is pointed at the Earth.

Again, by using the ADS-B datastream to determine the integrity of reflected signals, there is no difference in the transmitted signal between the ADS-B radar system and an ADS-B system that does not use the transmitted signal for radar. An adversary target will have no way of knowing if he has been detected. The user of the ADS-B radar can use the tactic of acting as though he has not detected the adversary target. At some point the tactic can change, such as by shooting down the adversary target.

In a third preferred embodiment a separate receiver is used with the directional antenna to make it possible to receive and process radar returns without the risk of missing ADS-B messages from other aircraft.

There is a possible issue when the target is close enough that the ADS-B message is still being sent when the beginning of the reflected signal has started coming back. The ADS-B message using the 1090 ES Data Link is 120 us long. See FIG. 4. At the speed of light (186,300 miles/sec) this corresponds to approximately 22.4 miles. Since this includes the trip to the target and back again it means a range to the target of approximately 11.2 miles. However, because of causality we know that the end of the reflected ADS-B message must happen after the end of the transmitted ADS-B message. The transmitted signal and the received reflection signal will overlap but cannot overlap completely. The question is how much of the non-overlapped reflection signal do we need in order to verify with good probability that we are receiving our own reflected ADS-B message and not the ADS-B message from another aircraft. Again referring to FIG. 4, the ADS-B message ends with 24 bits of CRC (cyclic redundancy check) which is an error detection and correction code that allows up to 5 bits in the ADS-B message to be corrected. The probability that an ADS-B message from another aircraft will have the same CRC as the User's ADS-B message is very small. The 24-bit CRC code is 24 us long, which corresponds to a range to the target of approximately 2.2 miles.

The use of a directional antenna in the second and third embodiments makes it even less likely that the signal being received is from another aircraft so the number of bits required to give a good probability that the signal being received is a valid reflection can be decreased, thereby decreasing the minimum range of detection.

Thus, the datastream comparator can be configured so that it does not need to compare the complete ADS-B message in order to verify with good probability that the signal being received is a reflection and not another aircraft's ADS-B signal.

BRIEF DESCRIPTION OF THE DRAWINGS

The invention may best be understood by referring to the following description and accompanying drawings which illustrate the invention. In the drawings.

DETAILED DESCRIPTION

In the following description, numerous specific details are set forth to provide a thorough understanding of the invention. However, it is understood that the invention may be practiced without these specific details. In other instances well-known circuits, structures, and techniques have not been shown in detail in order not to obscure the invention.

Figure 1:
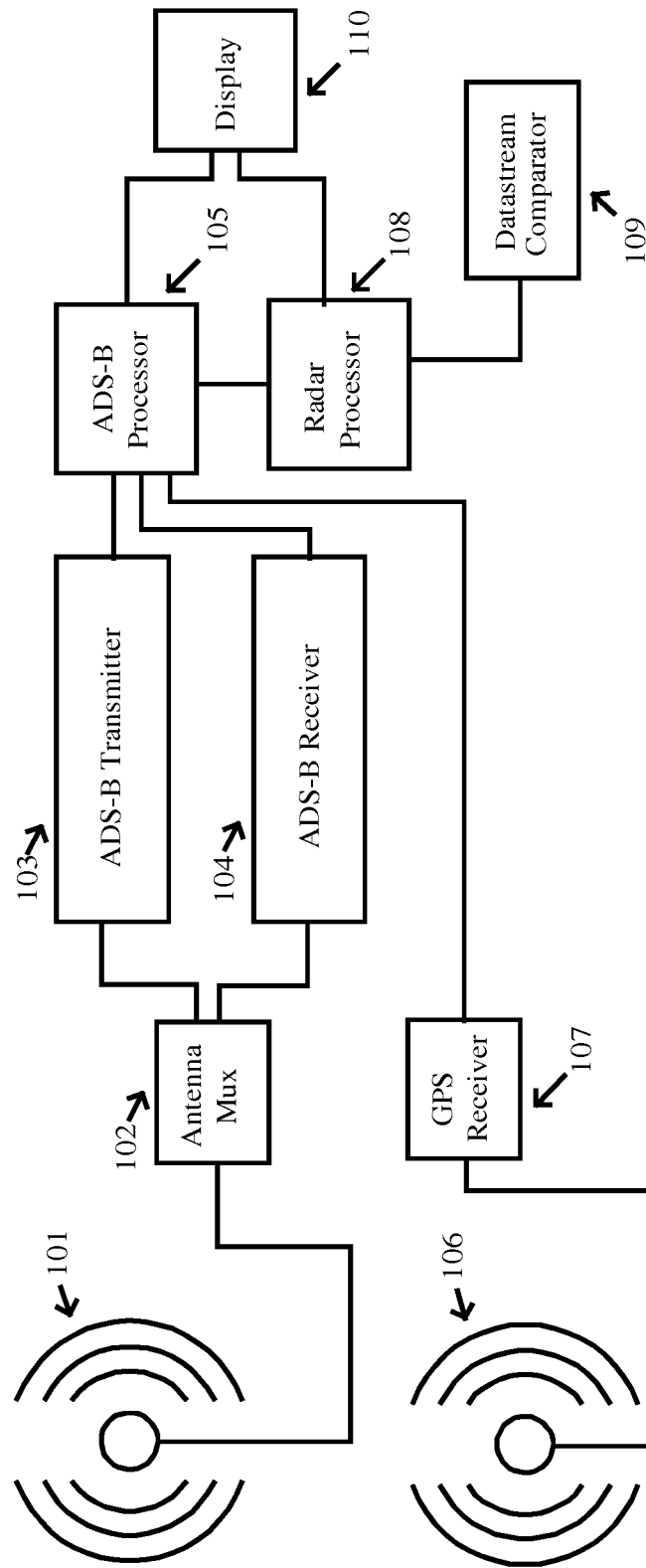
FIG. 1 is a general illustration showing an ADS-B system used as a radar, using omni-directional antennas.

FIG. 1 is a general illustration showing an ADS-B system used as a radar, using omni-directional antennas. ADS-B Transmitter 103 periodically transmits a message containing the present aircraft's unique ID, GPS coordinates, and other data using Omni-Directional antenna 101. When ADS-B Transmitter 103 is not transmitting, ADS-B Receiver 104 is listening for messages transmitted by other aircraft containing their unique ID, GPS coordinates, and other data. An Antenna Multiplexer (Antenna Mux 102) is used to route the signals from Omni-Directional Antenna 101 to ADS-B Transmitter 103 and ADS-B Receiver 104. Omni-Directional Antenna 106 is used with GPS Receiver 107 to provide the GPS coordinates of the present aircraft. All of this is controlled by ADS-B Processor 105.

ADS-B operation is improved by using the signal produced by ADS-B Transmitter 103 as a radar with reflected signals received by ADS-B Receiver 104 under the control of ADS-B Processor 105 and Radar Processor 108.

Datastream Comparator 109 determines the integrity of a reflected signal by comparing the datastream of the reflected signal with the datastream of the transmitted signal.

If the number and range of targets reported by radar do not match the number and range of aircraft reported by ADS-B then there is an aircraft out there that does not have ADS-B, it is broken or has been disabled, or there is a false ADS-B signal present.

The results are displayed on Display 110.

Datastream Comparator 109 may be combined with Radar Processor 108. Radar Processor 108 may be combined with ADS-B Processor 105.

Figure 2:
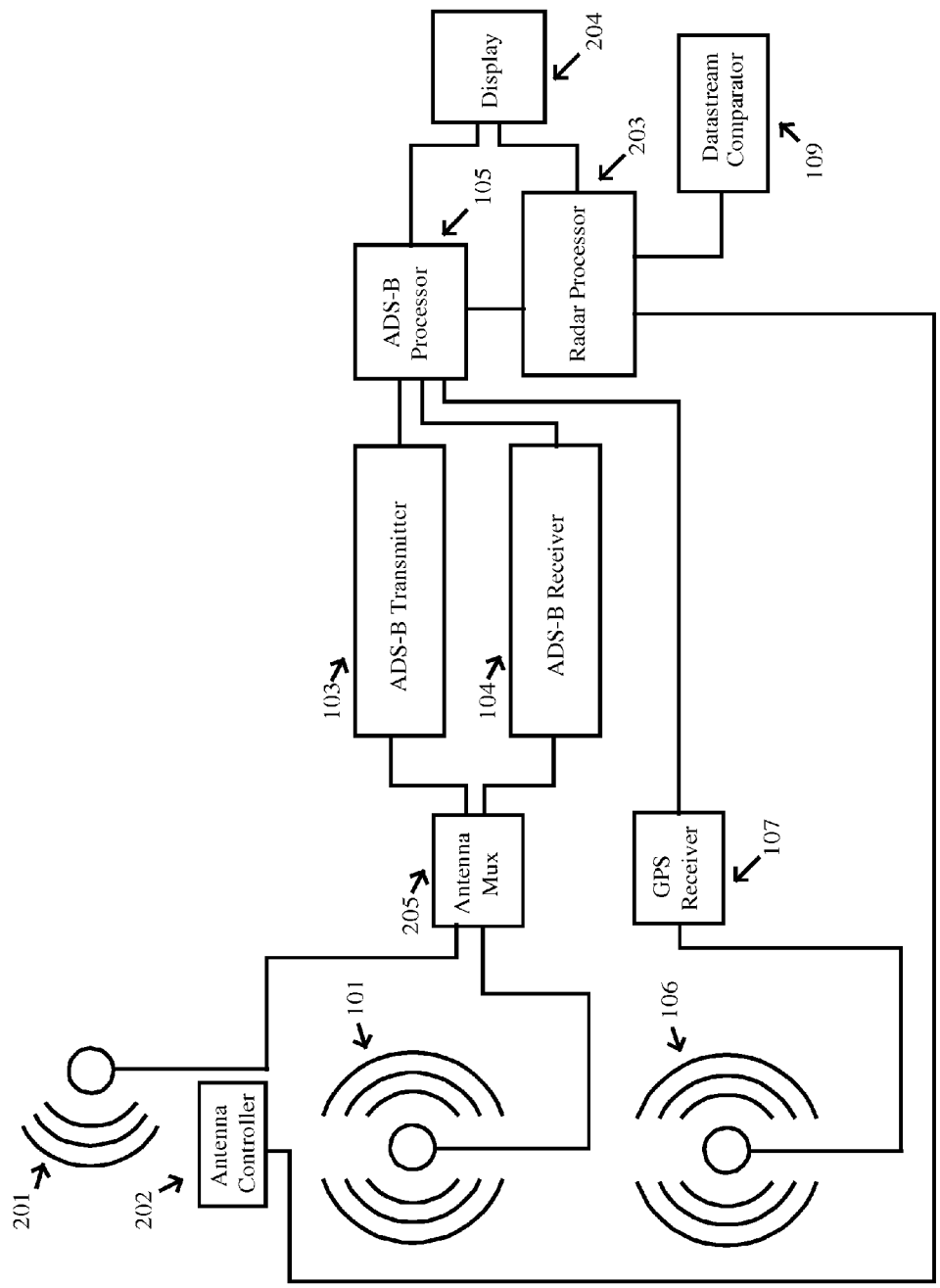
FIG. 2 is a general illustration showing an ADS-B system used as a radar, using a separate directional receiving antenna.

In FIG. 2, a separate directional antenna (Directional Antenna 201) is selected by Antenna Mux 205 to receive the reflected signals. The advantage of using a separate antenna for this function is that it is directional, as opposed to Omni-Directional Antenna 101. Directional Antenna 201 can also be used by ADS-B Transmitter 103 in order to strengthen radar returns from a specific target or to increase the range of the system in a specific direction.

Directional Antenna 201 is controlled by Antenna Controller 202 under the direction of Radar Processor 203 which also controls the radar function through ADS-B Processor 105. Directional Antenna 201 and Antenna Controller 202 may be a system that mechanically aims Directional Antenna 201 or the combination may be an electronically scanned array.

Datastream Comparator 109 determines the integrity of a reflected signal by comparing the datastream of the reflected signal with the datastream of the transmitted signal.

If the number, range, and bearing of targets reported by radar do not match the number, range, and bearing of aircraft reported by ADS-B then there is an aircraft out there that does not have ADS-B, it is broken or has been disabled, or there is a false ADS-B signal present.

The results are displayed on Display 204.

Datastream Comparator 109 may be combined with Radar Processor 203. Radar Processor 203 may be combined with ADS-B Processor 105.

Figure 3:
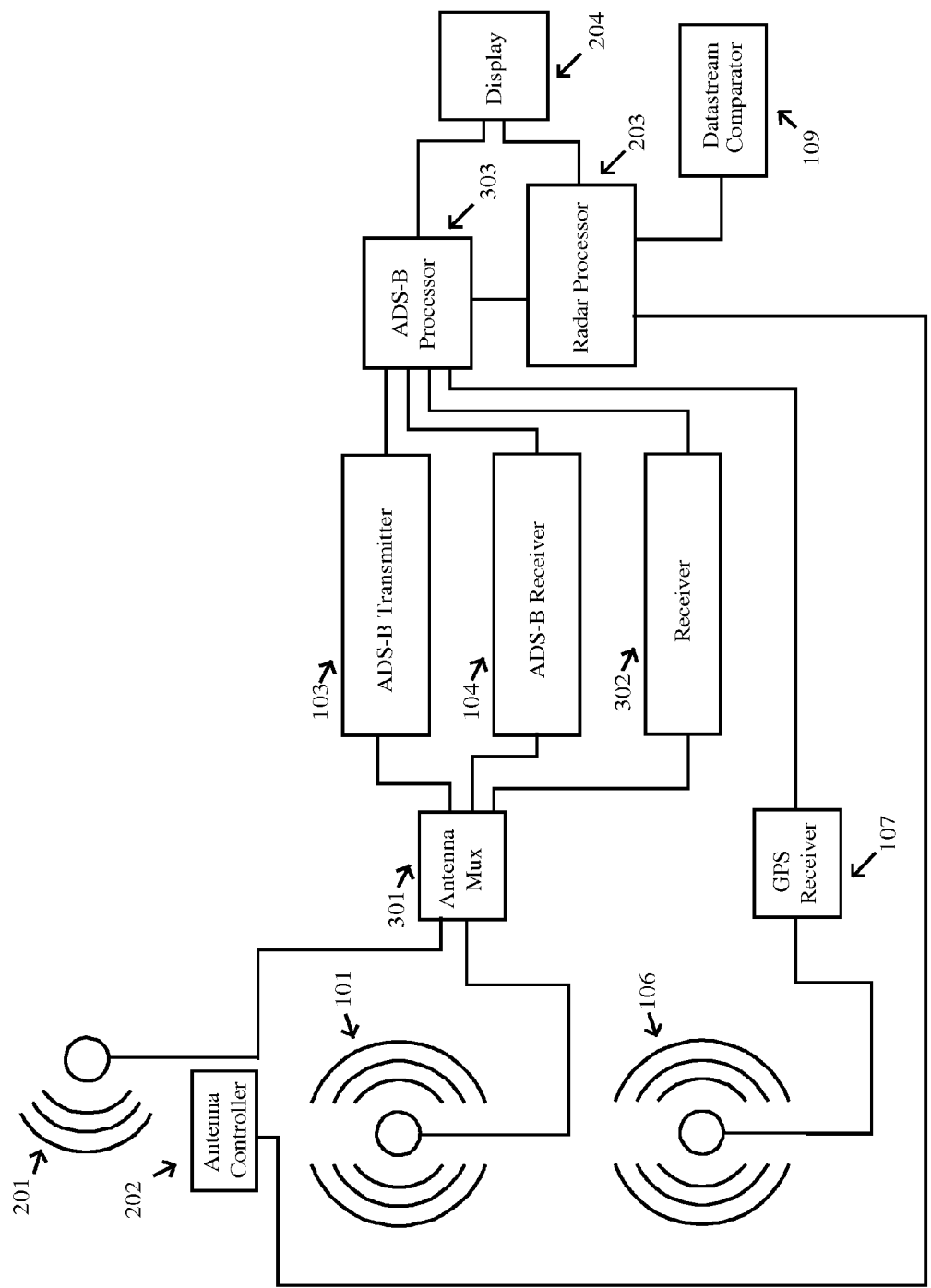
FIG. 3 is a general illustration showing an ADS-B system used as a radar, using a separate directional receiving antenna and a separate receiver.
Figure 4:
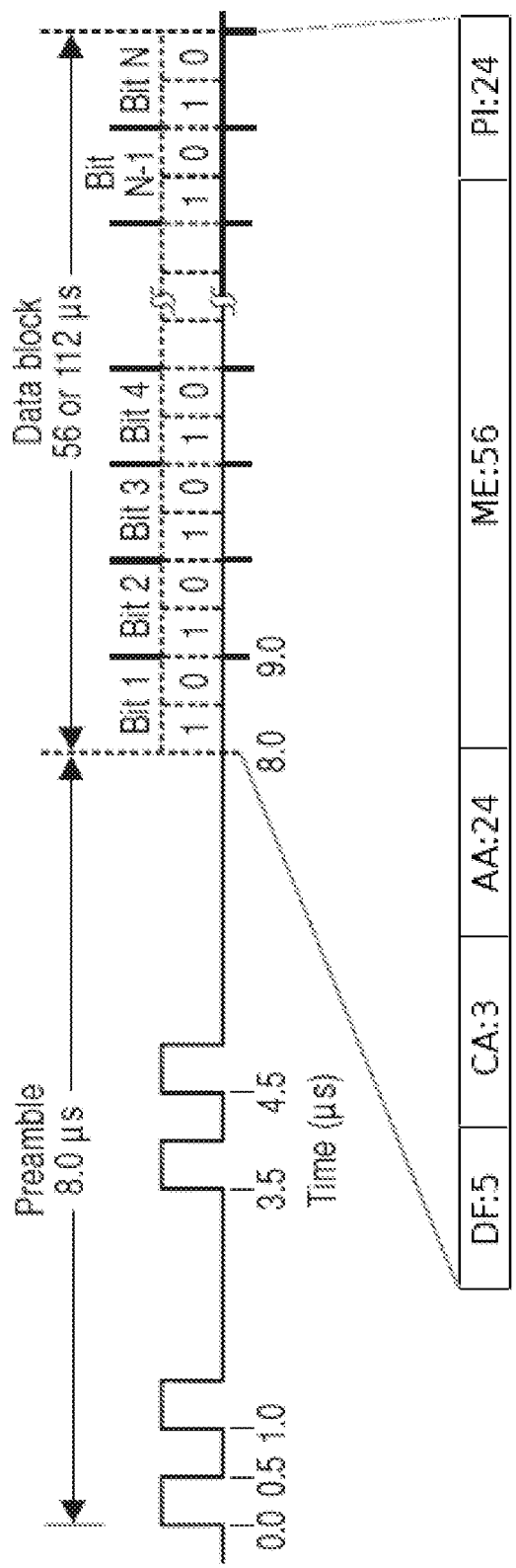
FIG. 4 is a reproduction of FIG. 2 from Security of ADS-B: State of the Art and Beyond by Strohmeier, Lenders, and Martinovic (IDS cite 16)

In FIG. 3, as an alternative to sharing ADS-B Receiver 104, Directional Antenna 201 can be used with its own receiver. Antenna Mux 301 routes Directional Antenna 201 to Receiver 302 whose output goes to ADS-B Processor 303 to make it possible to receive and process radar returns without the risk of missing ADS-B messages from other aircraft.

The integrity of a reflected signal is determined by comparing the datastream of the reflected signal with the datastream of the transmitted signal.

If the number, range, and bearing of targets reported by radar do not match the number, range, and bearing of aircraft reported by ADS-B then there is an aircraft out there that does not have ADS-B, it is broken or has been disabled, or there is a false ADS-B signal present.

The results are displayed on Display 204.

Datastream Comparator 109 may be combined with Radar Processor 203. Radar Processor 203 may be combined with ADS-B Processor 303.

While preferred embodiments of the present invention have been shown, it is to be expressly understood that modifications and changes may be made thereto.

I claim:

1. A system for sensing aircraft and other objects comprising:
    (a) an ADS-B transmitter;
    (b) an ADS-B receiver;
    (c) an ADS-B antenna;
    (d) an ADS-B antenna multiplexer;
    (e) an ADS-B processor;
    (f) a radar processor;
    (g) a datastream comparator;
    (h) a display;
    whereby
    (i) said ADS-B processor is configured to control said ADS-B antenna multiplexer, and said ADS-B multiplexer is configured to allow either said ADS-B transmitter or said ADS-B receiver to use said ADS-B antenna,
    (j) said ADS-B processor and said radar processor are configured to work together,
    (k) said ADS-B processor is configured to periodically cause said ADS-B transmitter to emit a transmitted signal through said ADS-B antenna multiplexer to said ADS-B antenna,
    (l) said transmitted signal is reflected by a target producing a reflected signal,
    (m) said reflected signal is received by said ADS-B antenna, and said ADS-B antenna multiplexer is configured to send said reflected signal to said ADS-B receiver,
    (n) said radar processor is configured to process said reflected signal from said ADS-B receiver and said transmitted signal from said ADS-B transmitter to determine a range to said target,
    (o) said datastream comparator is configured to compare the datastream of said transmitted signal and the datastream from said reflected signal,
    (p) said radar processor is configured to display said range on said display,
    and whereby
    (q) if said range to said target does not match a possible position of said target as reported by ADS-B messages from said target said radar processor is configured to note this on said display as a first attention item,
    (r) said radar processor is configured to use the change in the positions of said target as reported by said ADS-B messages received from said target to calculate a reported radial velocity of said target,
    (s) said radar processor is configured to use the Doppler shift of said reflected signal to calculate a measured radial velocity of said target,
    (t) a discrepancy between said reported radial velocity of said target and said measured radial velocity of said target indicates a system error comprising GPS spoofing, failure of the ADS-B system on said target, or deliberate misreporting by said target and said radar processor is configured to note said discrepancy on said display as a second attention item, and (u) a receipt of said ADS-B messages from said target that is not confirmed by a reflected signal indicates that a false ADS-B signal is being broadcast and said radar processor is configured to note said false ADS-B signal on said display as a third attention item.

2. A system for sensing aircraft and other objects comprising:
  (a) an ADS-B transmitter;
  (b) an ADS-B receiver;
  (c) a first ADS-B antenna;
  (d) a second ADS-B antenna;
  (e) an antenna controller;
  (f) an ADS-B antenna multiplexer;
  (g) an ADS-B processor;
  (h) a radar processor;
  (i) a datastream comparator;
  (j) a display;
  whereby
  (k) said second ADS-B antenna is directional, and said radar processor is configured to control said antenna controller which is configured to control the direction of said second ADS-B antenna,
  (l) said ADS-B processor is configured to control said ADS-B antenna multiplexer, and said ADS-B antenna multiplexer is configured to allow said ADS-B transmitter to use either said first ADS-B antenna or said second ADS-B antenna, and said ADS-B antenna multiplexer is also configured to allow said ADS-B receiver to use either said first ADS-B antenna or said second ADS-B antenna,
  (m) said ADS-B processor and said radar processor are configured to work together,
  (n) said ADS-B processor is configured to periodically cause said ADS-B transmitter to emit a transmitted signal through either said first ADS-B antenna or said second ADS-B antenna through said ADS-B antenna multiplexer,
  (o) said transmitted signal is reflected by a target producing a reflected signal,
  (p) said reflected signal is received by either or both said first ADS-B antenna and said second ADS-B antenna, and said ADS-B antenna multiplexer is configured to select either said first ADS-B antenna or said second ADS-B antenna and send said reflected signal to said ADS-B receiver,
  (q) said radar processor is configured to process said reflected signal from said ADS-B receiver and said transmitted signal from said ADS-B transmitter to determine a range to said target,
  (r) said radar processor is configured to use the direction of said second ADS-B antenna to determine a bearing to said target,
  (s) said datastream comparator is configured to compare the datastream of said transmitted signal and the datastream from said reflected signal,
  (t) said radar processor is configured to display said range and said bearing on said display,
  and whereby
  (u) if said range and said bearing to said target do not match the position of said target as reported by ADS-B messages from said target said radar processor is configured to note this on said display as a first attention item,
  (v) said radar processor is configured to use the change in the positions of said target as reported by ADS-B messages received from said target to calculate a reported radial velocity of said target,
  (w) said radar processor is configured to use the Doppler shift of said reflected signal to calculate a measured radial velocity of said target,
  (x) a discrepancy between said reported radial velocity of said target and said measured radial velocity of said target indicates a system error comprising GPS spoofing, failure of the ADS-B system on said target, or deliberate misreporting by said target, and said radar processor is configured to note said discrepancy on said display as a second attention item, and
  (y) a receipt of said ADS-B messages from said target that is not confirmed by a reflected signal indicates that a false ADS-B signal is being broadcast and said radar processor is configured to note said false ADS-B signal on said display as a third attention item.

3. A system for sensing aircraft and other objects comprising:
  (a) an ADS-B transmitter;
  (b) a first ADS-B receiver;
  (c) a first ADS-B antenna;
  (d) a second ADS-B receiver;
  (e) a second ADS-B antenna;
  (f) an antenna controller;
  (g) an ADS-B antenna multiplexer;
  (h) an ADS-B processor;
  (i) a radar processor;
  (j) a datastream comparator;
  (k) a display;
  whereby
  (l) said second ADS-B antenna is directional and said radar processor is configured to control said antenna controller which is configured to control the direction of said second ADS-B antenna,
  (m) said ADS-B processor is configured to control said ADS-B antenna multiplexer, and said ADS-B antenna multiplexer is configured to allow said ADS-B transmitter to use either said first ADS-B antenna or said second ADS-B antenna, and said ADS-B antenna multiplexer is also configured to allow said first ADS-B receiver to use either said first ADS-B antenna or said second ADS-B antenna, and said ADS-B antenna multiplexer is also configured to allow said second ADS-B receiver to use either said first ADS-B antenna or said second ADS-B antenna,
  (n) said ADS-B processor and said radar processor work together,
  (o) said ADS-B processor is configured to periodically cause said ADS-B transmitter to emit a transmitted signal through either said first ADS-B antenna or said second ADS-B antenna through said ADS-B antenna multiplexer,
  (p) said transmitted signal is reflected by a target producing a reflected signal,
  (q) said reflected signal is received by either or both said first ADS-B antenna or said second ADS-B antenna, and said ADS-B multiplexer is configured to select either said first ADS-B antenna or said second ADS-B antenna and send said reflected signal to said second ADS-B receiver,
  (r) said radar processor is configured to process said reflected signal from said second ADS-B receiver and said transmitted signal from said ADS-B transmitter to determine a range to said target,
  (s) said radar processor is configured to use the direction of said second antenna to determine a bearing to said target, (t) said datastream comparator is configured to compare the datastream of said transmitted signal and the datastream from said reflected signal, (u) said radar processor is configured to display said range and said bearing on said display, and whereby (v) if said range and said bearing to said target do not match the position of said target as reported by ADS-B messages from said target said radar processor is configured to note this on said display as a first attention item, (w) said radar processor is configured to use the change in the positions of said target as reported by said ADS-B messages received from said target to calculate a reported radial velocity of said target, (x) said radar processor is configured to use the Doppler shift of said reflected signal to calculate a measured radial velocity of said target, (y) a discrepancy between said reported radial velocity of said target and said measured radial velocity of said target indicates a system error comprising GPS spoofing, failure of the ADS-B system on said target, or deliberate misreporting by said target, and said radar processor is configured to note said discrepancy on said display as a second attention item, and (z) a receipt of said ADS-B messages from said target that is not confirmed by a reflected signal indicates that a false ADS-B signal is being broadcast and said radar processor is configured to note said false ADS-B signal on said display as a third attention item.

\* \* \* \* \*